Aug. 28, 1934.  E. CULVER ET AL  1,971,394
MANUFACTURE OF FUSED BIFOCAL LENSES
Filed May 23, 1930
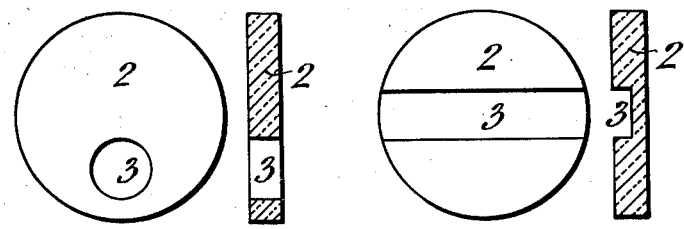
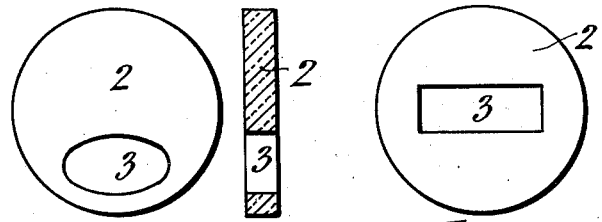
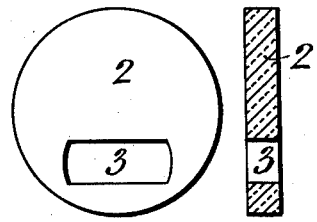
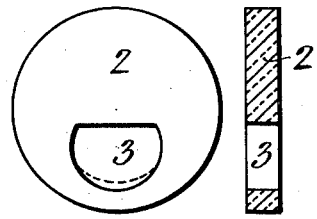
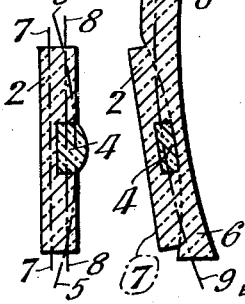
INVENTORS
EDWARD CULVER,
ALFRED HENRY EMERSON Patented Aug. 28, 1934

1,971,394

UNITED STATES PATENT OFFICE 1,971,394

MANUFACTURE OF FUSED BIFOCAL LENSES

Edward Culver, Crouch End, London, and Alfred Henry Emerson, Finchley, London, England, assignors to United Kingdom Optical Company, Limited, London, England Application May 23, 1930, Serial No. 455,030
In Great Britain January 28, 1930

7 Claims. (Cl. 88—54)

This invention relates to an improved method of manufacture of fused bifocal lenses, and more particularly has reference to the preparation of the button formed of the same glass as the major lens and having an insert of glass of a higher refractive index, which button after surfacing is fused into a correspondingly ground depression in the major lens.

In the older forms of fused bifocal lenses familiarly known as kryptok, Twofo, etc., the reading portion is formed by fusing into a spherically worked depression, ground in a major crown lens (commonly called a countersink) a flint lens, which has one spherical surface worked so as substantially to fit the depression in the crown lens which after fusing and surfacing in the ordinary way produces a bifocal lens blank having a circular reading portion. It is well known that the diameter of this reading circle is kept relatively small for the reasons that manufacturing difficulties arise when large sizes are attempted. Moreover, large sizes give rise to extra thickness in the completed lens and excessive chromatic aberration, small sizes are still adhered to although the diameter of the reading circle is one of the factors governing the position of the optical centre in this type of lens. A further disadvantage is that the reading portion reaches to the bottom of the completed lens so that the user cannot see the ground or steps clearly except by looking either over or to one side of the reading portion.

In the fused bifocal described in the specification of Patent No. 1,632,208, the button in certain cases is prepared by fusing two pieces of crown glass on either side of an oblong piece of flint glass (of a higher refractive index), but, while by this method, some of the disadvantages outlined above are overcome, it is impossible to control the prismatic power, more especially as to direction, as explained in our British Patent No. 346,866 accepted April 28, 1931.

The main object of this invention is to provide a method of manufacture so that these important conditions of a bifocal lens can be accurately controlled, i. e., the size, shape and also the position of the optical centre of the reading portion.

A further object of the invention is the provision of a button, by means of which if desired, any desired amount or direction of prism can be obtained in the final lens.

According to the present invention the button is prepared by moulding or cutting a hole, slot or groove in a plate of glass for the reception of an insert of glass having a higher refractive index, the whole then being subjected to heat to fuse the two glasses to one another.

The glass for the button body is usually of crown glass and is selected so as to have the same optical and physical properties as the glass used for the major lens or countersink. The inside of the hole or slot is suitably prepared in the usual manner for the reception of the insert, which is of a size so as nearly to fit the hole and also suitably prepared before being placed in position.

The two parts of the button are then placed in a furnace and raised to a temperature high enough to melt one or both of the glasses so that they fuse together at their edges and form a solid button which after being well annealed is surfaced to correspond with the depression curve ground on the major lens, in the usual way, although greater accuracy is required than is normally the case with a fused bifocal lens other than the type referrred to above.

It is to be understood that the slot may be formed by cutting the glass plate inwardly from one edge or the slot may be entirely within the plate. Alternatively a depression may be cut or otherwise formed in one side of the glass plate into which depression a piece of glass of higher refractive index is fused. It will thus be seen that the piece or insert of high index glass which is to become the reading portion is surrounded or nearly surrounded by glass of exactly the same optical properties as the major lens, the shape of the hole slot or depression mainly determining the final shape of the reading portion and which hole may be circular, oblong, oval, or of any other desired shape, such for example as the major segment of a circle.

The button after fusion is then ground in the manner described above and fused into a correspondingly ground depression in the major lens when it is ready for finishing.

The invention is illustrated in the accompanying drawing in which Figures 1 and 1A are respectively an elevation and diametrical section of a plate of glass for use in the manufacture of a button in accordance with this invention.

Figures 2-6, 2A-6A are similar views of alternative forms of plate.

Figures 7 and 8 are respectively diametrical sections of a button (after fusion) and a major lens to which the button has been fused.

Referring to the drawing 2 is a plate of glass in which is cut a hole, slot or socket 3 for the reception of an insert (not shown) of similar shape.

In Figures 1 and 1ᴬ the hole 3 is circular. Figures 2 and 2ᴬ show an oval hole, while in Figures 3 and 3ᴬ there is shown a slot, and which alternatively may be cut from one edge of the plate 2.

Referring to Figures 4 and 4ᴬ the hole consists of the major segment of a circle, though in some cases a minor segment may be suitable. With this shape of insert it will be clear that if desired, a portion of the button including the insert may be ground away to a line inside the circle as indicated in dotted lines thus decreasing the amount of prism in the finished lens.

In Figures 5 and 5ᴬ there is shown a slot and in Figures 6 and 6ᴬ a socket.

Referring now to Figures 7 and 8, 4 is an insert which has been mounted by fusion, in the plate 2, shown in Figures 5, 5ᴬ to form the button. The button is now ground to a curved surface indicated by the chain line 5 to fit the depression ground in the major lens 6 (Figure 8).

The other side of the button may then be ground to a surface indicated by the chain line 7, or alternatively (for example) to a surface indicated by the chain line 8. The button, thus finished, is fused in to the depression of the major lens, which is finally ground to a surface indicated by the chain line 9.

What we claim is:—

1. In a button for a bifocal lens, a button body of substantially the same refractive index as the major distance lens having a rectangular groove in the face thereof and a rectangular insert fused therein for near vision reading purposes of a different refractive index than that of the major distance vision portion, the grooved side of said button body being adapted to engage said major portion.

2. In a bifocal lens blank, a major distance lens having an arcuate countersink ground in the face thereof, and a button inserted therein comprising a button body of glass of the same index of refraction as the major distance lens and a rectangular insert in the face thereof of a different index of refraction, said insert being so arranged that it is located between the major distance lens in the countersink thereof and the body of the button.

3. In a button for a multifocal lens, a button body having a rectangular groove in a face thereof, and a rectangular insert secured therein, the grooved side of said button body being adapted to engage the major portion of the lens, said insert having a different index of refraction from said button body and major portion, and said major portion and button body having the same index of refraction.

4. In a button for a bifocal lens, a button body of substantially the same refractive index as the major distance lens having in the face thereof a socket with a bottom and approximately perpendicular side walls, and an insert fused therein for near vision reading purposes of a different refractive index from that of the major distance vision portion, the socketed side of said button body being adapted to engage said major portion.

5. In a button for a multifocal lens, a button body having in the face thereof a socket with a bottom and approximately perpendicular side walls, and an insert secured therein, the socketed side of said button body being adapted to engage the major portion of the lens, said insert having a different index of refraction from said button body and major portion, and said major portion and button body having the same index of refraction.

6. In a bifocal lens blank, a major distance lens having a countersink of arcuate cross section ground in the face thereof and a button inserted therein comprising a button body of glass of the same index of refraction as said major lens having in the face thereof a socket with a bottom and approximately perpendicular side walls, and an insert of a different index of refraction therefrom in said socket, said insert being so arranged that it is located between the major distance lens in the countersink thereof and the button body of the button.

7. In a bifocal lens blank, a major distance lens having a countersink of arcuate cross section ground in the face thereof and a button inserted therein comprising a button body of glass of the same index of refraction as said major lens having in the face thereof a socket with a bottom and approximately perpendicular side walls, and an insert of a different index of refraction therefrom in said socket, said insert being so arranged that it is located between the major distance lens in the countersink thereof and the button body of the button, said socket being of sufficient depth that the bottom thereof shall be ground away and the insert exposed when the button side of the blank is surfaced.

EDWARD CULVER.
ALFRED HENRY EMERSON.